United States Patent
Greene et al.

(10) Patent No.: US 6,423,415 B1
(45) Date of Patent: Jul. 23, 2002

(54) POTASSIUM SILICATE FRITS FOR COATING METALS

(75) Inventors: Margaret E. Greene, Corning; Robert Morena, Caton, both of NY (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 09/652,832

(22) Filed: Aug. 31, 2000

(51) Int. Cl.$^7$ .............................. B32B 17/06; B05D 3/02
(52) U.S. Cl. ...................... 428/432; 428/472; 427/376.1
(58) Field of Search .......................... 106/14.05, 286.1, 106/287.17, 600, 631; 427/376.4; 428/472; 501/11, 55

(56) References Cited

U.S. PATENT DOCUMENTS

| | | | |
|---|---|---|---|
| 3,052,982 A | 9/1962 | Weinstein et al. | 32/8 |
| 3,900,329 A | 8/1975 | Grubb et al. | |
| 4,099,990 A | 7/1978 | Brown et al. | 148/6.35 |
| 4,410,418 A | 10/1983 | Kukes et al. | 208/48 |
| 5,094,677 A | 3/1992 | Morena | 65/18.1 |
| 5,281,487 A | 1/1994 | Rumaner et al. | 428/552 |
| 5,622,551 A | * 4/1997 | Erbe et al. | 106/35 |
| 5,807,616 A | 9/1998 | Trotter, Jr. | 428/34.4 |
| 6,001,494 A | * 12/1999 | Kuchinski et al. | 428/653 |
| 6,071,563 A | 6/2000 | Kozlowski et al. | 427/374.7 |
| 6,074,713 A | 6/2000 | Trotter, Jr. | 428/34.4 |
| 6,096,432 A | * 8/2000 | Sakaguchi et al. | 428/428 |
| 6,200,631 B1 | 3/2001 | Kobayashi et al. | |

FOREIGN PATENT DOCUMENTS

WO    WO 97/41275    11/1997

OTHER PUBLICATIONS

"Phase Diagrams for Ceramists," Levin et al., *Amer. Cer. Soc.*, publ. 1964, p. 407. No month.

* cited by examiner

*Primary Examiner*—Deborah Jones
*Assistant Examiner*—Gwendolyn Blackwell-Rudasill
(74) *Attorney, Agent, or Firm*—Vincent T. Kung; Siwen Chen

(57) ABSTRACT

Glassy coatings that isolate metal surfaces from carbon particles, and a method of applying the coatings. The coatings composed of essentially $K_2O$, $SiO_2$, and $Al_2O_3$, and has a CTE of at least $80 \times 10^{-7}/°C$. These glassy coatings, which adhere well to metals, employ a potassium-silicate glass composition in three forms: a pure glass, a glass loaded with inert filler having a CTE higher than the glass itself, and a precursor frit that when "reactive-cerammed" produces a predominantly leucite crystalline phase and forms the glassy coating in-situ on the metal surface, creating a protective layer between the exposed metal surface and corrosive chemical-processing environments.

19 Claims, 6 Drawing Sheets

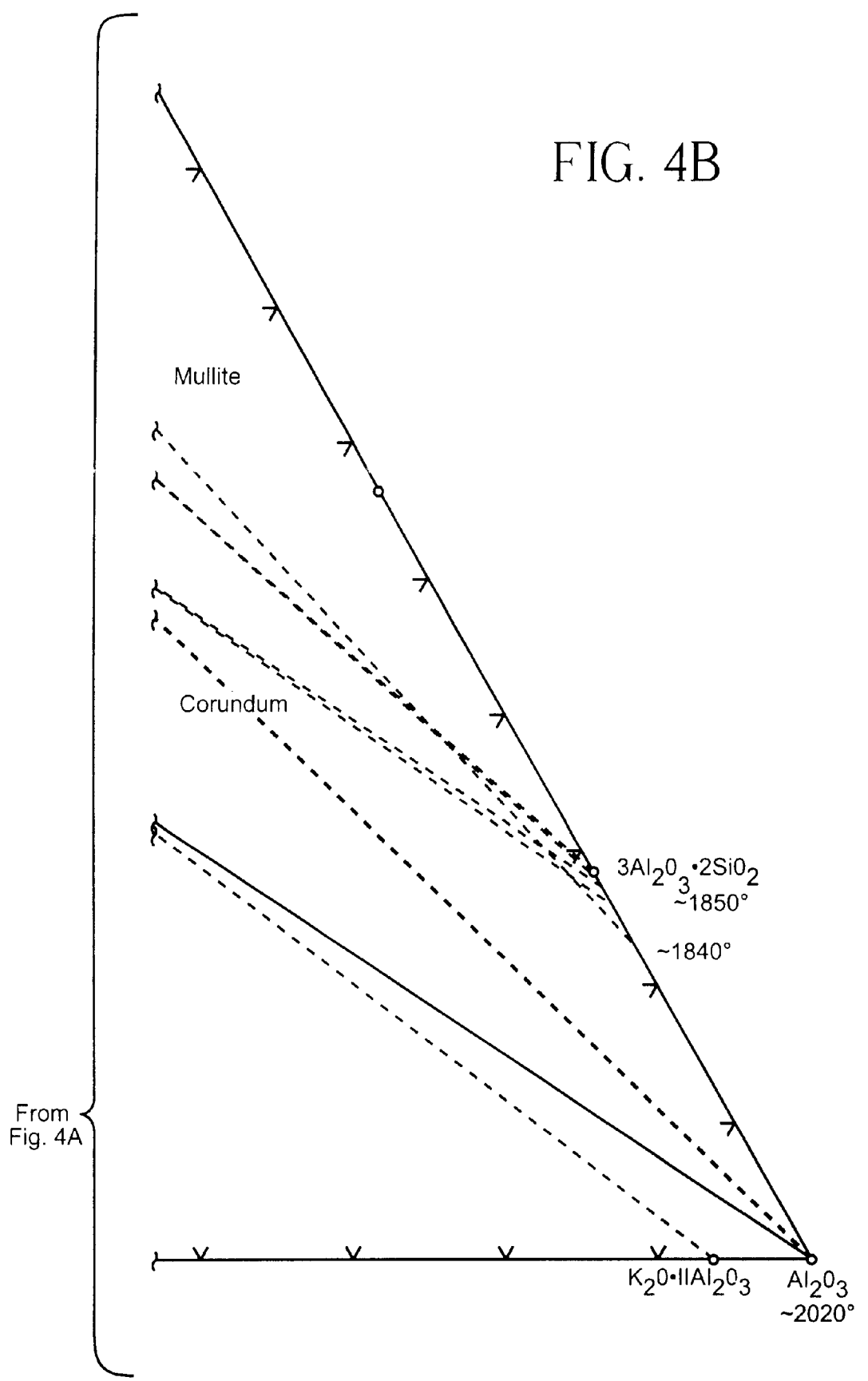

POTASSIUM SILICATE FRITS FOR COATING METALS

FIELD OF THE INVENTION

The present invention relates to an inorganic glassy coating and a method of protecting metal alloy bodies that are used generally in the chemical processing industry, such as components of a thermal-cracking furnace, against coke deposit build-up, corrosion, and carburization. In particular, the invention comprises a potassium silicate composition designed to form a durable protective glass that can adhere to the metal bodies to which it is applied.

BACKGROUND OF THE INVENTION

Industry has long been concerned about protecting surfaces on metal bodies, particularly iron-based alloys, from exposure to carbon at elevated temperatures and pressures in chemical manufacture and processing environments. Two problems commonly resulting from such exposure to carbon, especially in the petrochemical industry, are carbon build-up on the metal surfaces, commonly referred to as "coking," and carburization of the metal. Both problems are of particular concern in furnaces and tubing that service the thermal cracking of hydrocarbons such as ethane, propane, butane, naphtha, or gas oil to produce olefins, such as ethylene, propylene, or butenes. The cracking furnace forms the heart of many chemical-manufacturing processes. Often the performance of the cracking furnace will determine the major profit potential of the entire manufacturing process. Hence, it is extremely desirable to maximize the performance of the cracking furnace.

At the center of a thermal cracking process is the pyrolysis furnace. This furnace comprises a fire box through which runs an array of tubing. This array may be a set of straight tubes fed from a manifold, but frequently is a serpentine array of tubing. In either case, the array is composed of lengths of tubes and fittings that may total several hundred meters in length. The array of tubing is heated to a carefully monitored temperature by the fire box. A stream of gaseous feedstock is forced through the heated tubing under pressure and at a high velocity, and the product is quenched as it exits.

For olefin production the feedstock is frequently diluted with steam. The mixture is passed through the tubing array, which is operated at a temperature greater than 650° C. During this passage, a carboniferous residue, which is extremely durable and difficult to remove, forms and deposits on the interior walls of the tubing and fittings. The carbon residue appears initially in fibrous form on the walls. This type of filamentous coke grows in long threads, that is believed due to a catalytic reaction with nickel and iron in the metal alloy of the tubes. The fibrous carbon appears to form a mat on the interior walls of the tubes. A second type of amorphous coke forms in the gas phase and plates out from the gas stream. The fibrous carbon mat traps the secondary pyrolitic-coke particles that formed in the gas, resulting in a build-up of a dense, coke deposit on the tube walls. This build up of coke in the tubes dramatically shortens their useful life. The coke deposits clog the tubes after only a couple of weeks use. Consequentially, the chemical processing plants currently must either replace the corroded tubing or decoke the tubes, both of which may entail shutting down the chemical processing, and can cost the industry both valuable time and money to restart plant operations, as will be discussed more fully below.

Generally, when referring to coke deposition, the metal surfaces of the cracking tubes that are in contact with the feed stream and the metal surfaces of the heat exchangers that are in contact with the gaseous effluent are the areas affected. It should be recognized, however, that coke may form on connecting conduits and other metal surfaces which are exposed to hydrocarbons at high temperatures. Therefore, the term "metals" will be used hereinafter to refer to all metal surfaces in a thermal cracking process which are exposed to hydrocarbons and subject to coking.

The problem of carbon deposits forming on the interior surfaces of furnace tubes during the thermal cracking of hydrocarbons, such as ethylene, is one of long standing. Coking restricts the flow of the gaseous stream of reaction materials. But more importantly, the coke can act as a thermal insulator. Thermal insulating effect of the carbon build-up on the tube walls limits the process efficiency of the furnace to heat the gaseous stream. To maintain through-put of the hydrocarbon stream passing through the furnace, workers are forced to compensate by continuously raising the temperature of the fire box so that sufficient heat penetrates the tubing and maintains a steady temperature. The temperature of the tube outerwall continuously increases. Ultimately, a point is reached when the coke build-up is so severe that the tube skin temperature cannot be raised any further and the fire box and tubes reach temperatures where operations must discontinue or risk damage to the machinery. A shutdown of the furnace coils is then needed to remove the carbon deposit in a procedure called decoking, whereby the coke deposit is burned off. The decoking operation is necessary once every 10 to 90 days, and typically lasts for 24 to 96 hours, for light feed stock furnaces, and considerably longer for heavy feed stock operations.

During the decoking operation, no marketable production takes place, which means a major economic loss. Moreover, another effect of carbon formation on metal tubing in the cracking furnace impacts safety. The decoking process degrades tubes at an accelerated rate, leading to a shorter useful lifetime. In addition to the inefficiencies, discussed above, the formation of coke also leads to accelerated carburization and other forms of corrosion and erosion of the tube innerwall.

Carburization results from the diffusion of carbon into the steel alloy, where the carbon reacts with chromium in the alloy forming brittle carbide phases. The metal alloy loses its original oxidation resistance, thereby becoming susceptible to chemical attack. Over time, this process leads to volume expansion and the metal becomes gradually more and more brittle, accompanied with a consequent loss of mechanical strength and possible cracking. Since such chemical operations are typically conducted under considerable pressure and tensile load, the danger of tube rupture increases. Both tensile load and pressure during the thermal cracking process tend to be relatively constant factors, but as a metal tube is weakened these factors become more significant. Again, it then becomes necessary to shut the operations down and completely rebuild the furnace with new tubing. At normal operating temperatures half of the wall thickness of some steel tube alloys can be carburized in as little as two years of service. More typical tube lifetimes range from 3 to 6 years.

In the past, numerous solutions to the problem of coking have been proposed. One such solution involves producing metal alloys having special compositions. Another proposed solution entails coating the interior wall of the tubing with a silicon containing coating, such as silica, silicon carbide, or silicon nitride. Methods illustrative of this second approach have been disclosed in patents such as U.S. Pat. No. 4,099,990 (Brown et al.) or U.S. Pat. No. 4,410,418 (Kukes et al.).

In still other proposals, the interior wall of the tubing is treated with a chromium and/or an aluminum compound. One such method was developed by Westaim Technologies, Inc., which is disclosed in WO 97/41275. The Westaim method generates surface alloys by depositing onto a metal surface elemental silicon and titanium with at least one of aluminum and chromium, and then heat treating to produce a protective coating. In contrast to this more costly approach, which requires tens of dollars to treat a foot of tubing, and thus, rather commercially impractical, one of our purposes is to produce a more cost-effective coating to extend the useful life of pyrolysis furnaces, by means of substantially a single glassy layer.

A practice of incorporating additives, such as organic sulfur and phosphorus compounds in the feedstock stream, in attempts to passivate the tube metal surfaces, has also been employed in commercial processes. Another solution has proposed applying a glass-ceramic coating to metal to protect the metal surface from being carburized and becoming brittle, as well as, to lessen coking during a thermal cracking process. Table 1 provides in weight percent on an oxide basis as calculated from the precursor glass batch, the composition of several, different glass-ceramics, which have been proposed as protective coatings. Examples 1–6 illustrate alkaline earth metal alumino borates or borosilicates. Examples 7–14 illustrate alkaline earth silicates that may contain minor amounts of alumina or zirconia.

temperature metal surfaces. Currently, the metal tubes that are used in the chemical processing industry are protected using a variety of coatings on their interior surfaces. In the extremely corrosive atmosphere and high temperatures (500–1150° C.) that are involved in the chemical manufacturing process, however, no satisfactory coating is currently available commercially for our desired purposes. Hence, a new material having the requisite adhesion and durability properties is needed to protect metal surfaces that are subject to the high temperature and stresses of pyrolysis furnaces.

An objective of the present invention is to improve upon the anti-coking technology by turning to glassy coatings having a predominant leucite ($K_2O \cdot Al_2O_3 \cdot 4SiO_2$) crystal phase and formed in situ on the metal surface. Although previous research on dental porcelains had focused on leucite as a potential material that could combine some of the desired protective qualities, dental porcelains are nonetheless less well adapted to be able to withstand the high temperatures and sonic speeds of gas flow conditions required in chemical processing tubes. Dental porcelains typically contain a high percentage of glassy-phase relative to their leucite crystal content. Rather than protect any metal tubing to which they may be applied, the major glassy nature of dental porcelain compositions would tend to cause any coating made from them to be vulnerable to being swept away under the scouring conditions of the high-velocity, chemical gas flow. Moreover, dental porcelains tend not to

TABLE 1

GLASS CERAMIC COMPOSITIONS

| Ex. | $SiO_2$ | $B_2O_3$ | $Al_2O_3$ | BaO | MgO | CaO | ZnO | $ZrO_2$ | $MnO_2$ | SrO | NiO | F |
|---|---|---|---|---|---|---|---|---|---|---|---|---|
| 1 | — | 19.1 | 27.9 | 42.0 | 11.0 | — | — | — | — | — | — | — |
| 2 | — | 25.4 | 18.6 | 56.0 | — | — | — | — | — | — | — | 6 |
| 3 | 17.5 | 20.2 | 29.7 | — | — | 32.6 | — | — | — | — | — | — |
| 4 | 9.6 | 22.2 | 32.5 | — | — | 35.8 | — | — | — | — | — | — |
| 5 | 30.6 | 12.7 | 3.8 | 15.9 | 23.5 | — | 13.5 | — | — | — | — | — |
| 6 | — | 27.0 | 19.8 | 29.7 | 7.8 | — | 15.8 | — | — | — | — | — |
| 7 | 32.0 | — | — | 40.9 | — | — | — | 8.2 | 18.9 | — | — | — |
| 8 | 33.9 | — | 2.9 | 43.3 | — | — | — | — | 20.0 | — | — | — |
| 9 | 33.2 | 4.8 | — | 42.4 | — | — | — | — | 19.6 | — | — | — |
| 10 | 65.0 | — | 6.9 | — | — | — | — | — | — | 28.1 | — | — |
| 11 | 47.2 | — | — | — | — | — | 12.1 | — | — | 40.7 | — | — |
| 12 | 54.1 | — | 5.7 | — | — | — | — | — | — | 23.3 | 16.8 | — |
| 13 | 38.3 | — | — | — | — | — | — | 5.9 | 22.7 | 33.1 | — | — |
| 14 | 62.7 | — | 5.3 | 32.0 | — | — | — | — | — | — | — | — |

The efficacy of glass-ceramic coatings for the purpose of protection appears to be lower than desired for our purposes. Sections of the coating tended to separate from the metal substrate. This undesirable characteristic, we think is caused by an expansion mismatch between the metal and the glass-ceramic coating. Glass ceramics typically have coefficients of thermal expansion (CTE) in the range of 0–100× $10^{-7}/°$ C., which is much lower than the typical CTE of metals used in the refineries that range from 120–180×$10^{-7}/°$ C. Although normally considered desirable when dealing with standard enameling, this disparity between the lower CTE of typical glass-ceramics compared to metals creates high compressive stresses in the coating, which under the rather severe conditions inside a thermal cracking furnace during its operation increases the likelihood of spalling, since the furnace undergoes rapid thermal change during a decoking cycle.

Even with this intensive effort, the industry continues to face the problems created by carbon deposits on high undergo crystallization or phase changes, but rather, the porcelains retain their essential composition as admixtures of glass powders even after heating and sintering. Thus, their initial high glassy-phase content is retained after firing.

BRIEF DESCRIPTION OF THE INVENTION

The present invention is directed towards minimizing, if not preventing, carbon deposits from forming on certain metal alloy surfaces, in particular with metals used in reference to pyrolysis furnaces, and protecting the metal surfaces against the detrimental effects of carburization, which typically result from the carbon deposits. An embodiment of the present invention employs as coatings a potassium-silicate glass composition in both a pure glass and filled glass form, each with a coefficient of thermal expansion (CTE) of at least 80×$10^{-7}/°$ C. Another more preferred embodiment of the present invention uses high thermal expansion glass and glass-ceramic compositions that exhibit good adhesion to metal articles, particularly those articles used in the chemical processing industry, to prevent process gases from reacting with the metal alloy. It is an intention of the invention to provide a new method of forming in-situ a glassy coating with a CTE of at least $80 \times 10^{-7}/°$ C. (preferably, $120–220 \times 10^{-7}/°$ C.). Produced by means of an operation known as the "reactive-ceramming" process, the glassy coating has leucite as its predominant crystalline phase.

The inventive glass and glass-ceramic coatings create a protective layer between the exposed metal tube surface and corrosive environment inside. In some experimental trials, little if any coke builds-up in tubes treated with the glassy coating. Any amount of coke that does accumulate does so at a slower rate and only loosely bonds to the glass coated interior, unlike filamentous carbon, making the coke deposits softer and easier to remove than before.

BRIEF DESCRIPTION OF THE DRAWINGS

In the accompanying drawings:

FIGS. 4A and 4B are enlarged split diagrams of FIG. 4 with more details in the ternary phase diagram.

DETAILED DESCRIPTION OF THE INVENTION

Figure 1:
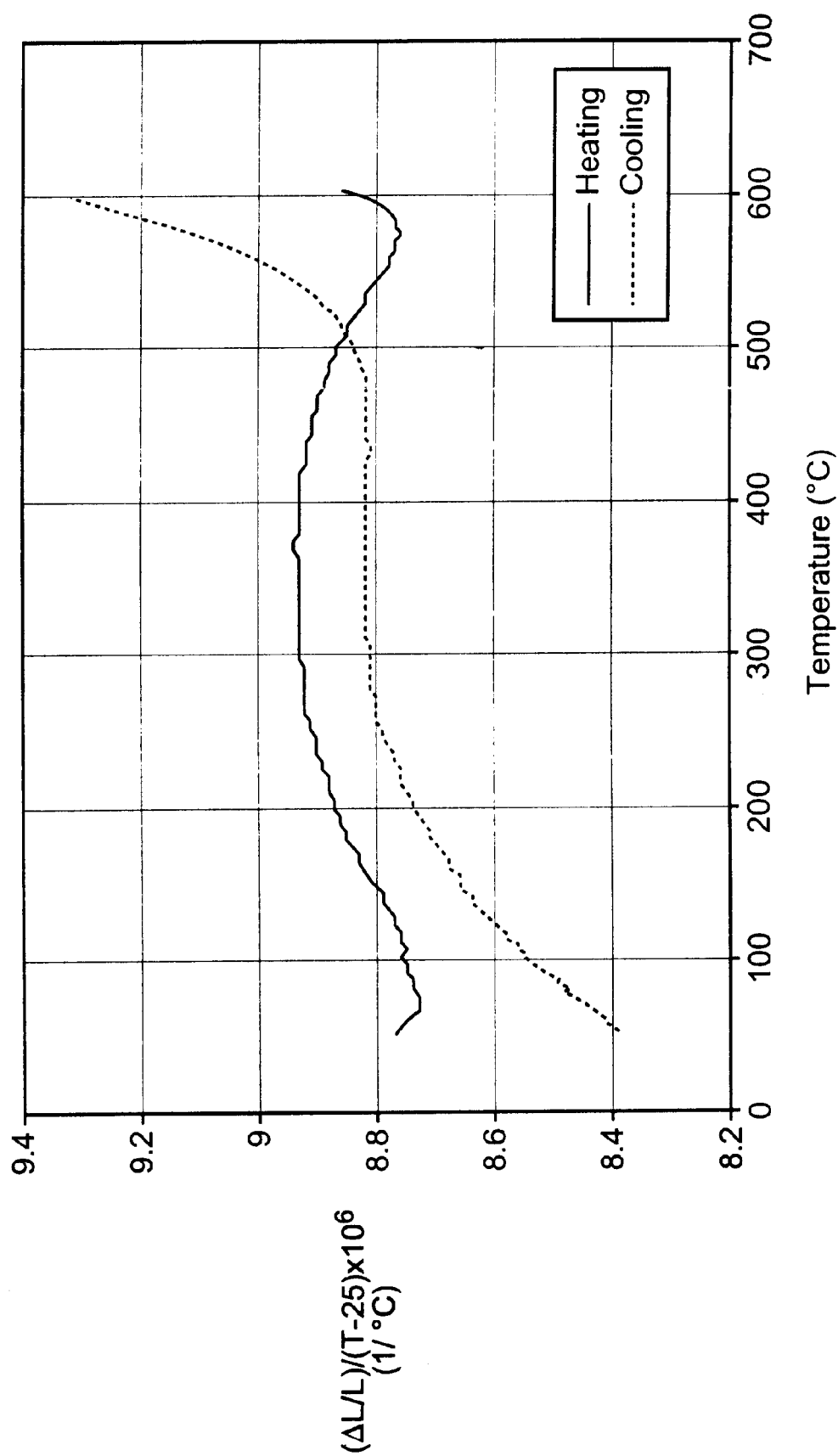
FIG. 1 is a curve of CTE as a function of temperature of the glass composition in Example 13–2.

The invention employs a thin, protective, glassy coating to act as an isolating layer for a metal alloy surface that is subject to high temperature and carbon deposit conditions, which typically leads to carburization. This isolating layer greatly minimizes carburization, thus keeping the metal ductile and extending its useful life, for example, as a furnace tube. More particularly the invention comprises applying a filled potassium silicate glass or glass-ceramic with leucite crystals as its predominant phase, as a coating onto a prepared metal surface, wherein the coating exhibits good adhesion and relatively compatible high coefficients of thermal expansion to that of the metal.

Metals typically have high coefficients of thermal expansion—often surpassing $100 \times 10^{-7}/°$ C.—which exceed that of many glasses and glass-ceramic materials. The high coefficients of thermal expansion make finding a suitable coating for high-temperature applications difficult. Normally, most glasses do not readily bind with metals because of this great disparity of their respective coefficients of thermal expansion. In the past, glass-ceramic materials have traditionally been used to coat metal surfaces for high temperature applications. But, glass ceramics lack the desired adhesion qualities. Glass-ceramic or even ceramic formulations that have been applied to metal surfaces, although having relatively comparable high coefficients of thermal expansion, did not have the advantage of good mechanical adhesion as these potassium silicate glasses appear to have. Thus, under the high temperature and pressure conditions of a cracking furnace, we observe other glass ceramics to have unacceptable levels of spalling.

Even though potassium-silicate glasses by themselves usually exhibit only moderate coefficients of thermal expansion, in the range of $85–90 \times 10^{-7}/°$ C., the potassium-silicate glasses of the present invention, however, demonstrated unexpectedly strong adhesion to metals. The inventive glasses showed a strong adhesion to metal surfaces with much higher coefficients of thermal expansion, in the range of $120–180 \times 10^{-7}/°$ C. Because of this property, these glasses appear to be good candidates as materials for use as coatings to protect metals from the deleterious effects of coking and carburization. This property of the potassium silicate glasses also indicated that they are an advance over the prior art.

In this coating project we hoped to achieve a durable glassy coating that is able to withstand the harsh conditions experienced by metals that are intended for use in the petrochemical process industry. The protective coatings of the present invention can take three basic forms. The first form is as a pure glass, while the second is as a filled glass (i.e., a glass which contains added particles of an inert phase), and the third is as a precursor frit for the formation of leucite crystals by the reactive-ceramming process. All three forms can produce an inventive coating. Each of the forms uses a potassium-silicate glass composition and each coating form exhibits a high CTE of at least $80 \times 10^{-7}/°$ C. and good adhesion to metals. Each form is described separately hereinafter.

As an aspect of the invention, we took advantage of the apparently good adhesion property of the present potassium-silicate glass to create glassy coatings with better compatible expansion to a metal alloy substrate. We added zirconia and/or a leucite-nepheline glass-ceramic as inert fillers to the preferred potassium-silicate composition. This increases significantly the coefficient of thermal expansion of the glass. The combination of a high-CTE, ability to withstand high temperatures, and good chemical durability is not readily available in a single glass or glass-ceramic material.

The glassy coatings of the present invention exhibit several advantages over other protective coating compounds currently available. First, the glassy coatings have compatible coefficients of thermal expansion that either match or are close to those of metals—being particularly suitable to the kind of metals used for petrochemical process tubing. Second, although not glass-ceramics, the three embodiments of the invention do exhibit high temperature stability like those found in glass-ceramic coatings. Temperature stability is a property that is necessary in coatings used to protect metal tubing from corrosive chemical environs. In particular, the predominantly leucite crystalline phase, produced by reactive ceramming the inventive, precursor frit composition show especially good thermal stability at high temperatures. Third, more importantly, the glassy coatings can be formed in-situ. This permits us to produce substantially defect-free coatings, which lastly, are more cost effective when compared to the expense associated with currently used protectants, such as that produced by the Westaim method, described above. Hence, the glassy coating affords potential cost savings in the treatment of metal tubing.

All comparative tests for the three embodiments—pure glass frit, filled frit, and leucite precursor frit—of the invention we made on metal substrate coupons. We experimented with austenitic and ferritic alloys, the two major types of metals employed in the chemical process industry. Austenitic alloys, such as HP-45, are used in processes, such as ethylene cracking, which operates at temperatures between 1000–1200° C. in a steam-hydrocarbon environment. The HP-45 alloy has, on a weight percent basis, a rough composition of: 30% iron, 26% chromium, and 35% nickel, and a coefficient of thermal expansion in the range of 160–190×10$^{-7}$/° C. Ferritic alloys, such as A-335, are found in furnaces designed for catalyst regeneration process, which operates at relatively lower temperatures, between 400–600° C. in a steam-hydrocarbon environment. The A-335 alloy has, on a weight-percent basis, a rough composition of: 90% iron, 10% chromium, and 1% molybdenum, and a coefficient of thermal expansion in the range of 130–150×10$^{-7}$/° C.

The metal coupons, each about 2.5–5.0 cm (1–2 inches) square of an Fe—Cr—Ni alloy containing 0.45% carbon, (e.g., HP-45 alloy), we cut from lengths of metal tubing cast for pyrolysis furnace use, and coated with the precursor glass frit. We prepared the metal coupons by initial sand-blasting to roughen the metal surfaces. Slurries using amyl acetate with 1.2% nitrocellulose were prepared from the glass frits and applied to the metal coupons by either spraying the slurry, or by repeatedly dipping the coupon into the slurry. More preferably, we spray-deposited a layer of the potassium silicate glass composition onto the metal substrate to a thickness of approximately from 0.0125 mm (0.5 mils) to 0.3 mm (12 mils), as measured by a thickness gauge. Each dried coating was then dried and fired at 1000–1150° C. to sinter the glass, producing a glassy, well-adhered coating.

When fired in air, a metal oxide layer forms at the interface between the glassy coating and the surface of the metal alloy. In contrast, when the metal was fired in nitrogen atmosphere, no metal oxide formed and we observed a tendency for increased spalling of the glassy coating during the firing process. Coatings applied to HP-45 alloy and fired in nitrogen atmosphere tended to spall-off spontaneously. On the other hand, A-335 alloys faired much better, with little if any spalling. Thus, it is our belief that this metal oxide layer, if kept relatively thin, helps to increase the adhesion of metal to glassy protective coating. This observation does not necessarily apply universally to all oxides when coating metal surfaces, however, in the case of the present inventive coatings the oxide layer produced does adhere well. The oxide layer likely has a CTE value that is intermediate between the metal surface and glassy coatings. This characteristic mitigates the stresses caused by thermal expansion mismatch. Yet, if the thickness of the metal oxide layer is not kept under control during firing, spalling may still occur.

Service life of the coatings was tested. Some samples we exposed to isothermal heating, while others were tested by thermal cycling under in-service, environmental conditions. In this testing, the coated samples was held at about 1100° C. for 96 hours in a forming gas environment (4% hydrogen and 96% nitrogen) with H$_2$O vapor introduced as steam at saturation levels, (e.g., 20%), and subsequently cooled to room temperature (25° C.). Adherence of the coating was tested by making a saw cut in the glassy coating, using a water-cooled, rotating, diamond-bonded saw blade. This test is based on a finding that poorly adhering coatings will quickly spall when touched by a saw. The coatings tested showed relatively good adherence. Also, when compared to the current situation, any coke deposits that do form are easily removed from metal tubing that have been treated with the inventive glassy coating, since the coke only loosely adheres to the glassy coating surface.

Section I.—Potassium Silicate Glass Frits

As mentioned before, although potassium-silicate glasses by themselves have only moderate expansions, in the range of 85–90×10$^{-7}$/° C., they exhibit strong adhesion properties to metals that have much higher coefficients of thermal expansion in the range of 120–180×10$^{-7}$/° C. We evaluated certain potassium silicate glass compositions, which are summarized in Table 2, for this coatings project. Note that the glasses tended to be tetra-silicates. That is, the K$_2$O:SiO$_2$ molar ratio is 1:4. Originally intended as precursors for forming leucite (K$_2$O—Al$_2$O$_3$—4SiO$_2$) in a process called "reactive-ceramming," discussed in Section III, these potassium silicate glasses, however, turned out to be useful, in and of themselves, as coatings, both as pure glasses, without fillers, and glasses loaded with an inert filler.

TABLE 2

POTASSIUM-SILICATE GLASS COMPOSITIONS

Oxides (Mole %)

| Ex. | K$_2$O | SiO$_2$ | Al$_2$O$_3$ | ZnO | MgO | Co$_3$O$_4$ | Na$_2$O | ZrO$_2$ |
|---|---|---|---|---|---|---|---|---|
| 13-1. | 19.5 | 78.0 | 2.5 | — | — | — | — | — |
| 13-2. | 14.5 | 78.0 | 2.5 | — | 5.0 | — | — | — |
| 13-3. | 14.0 | 75.4 | 2.3 | — | 4.7 | 4.0 | — | — |
| 13-4. | 19.1 | 64.3 | 1.3 | 15.4 | — | — | — | — |
| 13-5. | 8.1 | 64.3 | 1.3 | 15.4 | — | — | 8.1 | 2.9 |

In Table 2, the compositions for all of the coatings started with glass composition Example 13–1, a tetra-silicate frit having a small amount of Al$_2$O$_3$ to improve its moisture stability. Examples 13–2 through 13–5 are iterations of Example 13.1. We partially replaced ZnO for K$_2$O and SiO$_2$ in Examples 13–4 and 13–5, so as to improve flow and reactivity during the reactive-ceramming process. The presence of ZnO also caused the glass composition to be more prone to reduction in high hydrocarbon environments. In Examples 13–2 and 13–3, we partially replaced MgO for K$_2$O to improve flow for glassy coating applications. The presence of MgO also served to promote adhesion of the glass coating to the surface of the metallic substrate. We also evaluated the partial replacement of K$_2$O in Example 13–2 by alkaline earth oxides other than MgO, such as CaO and BaO, or by other alkali oxides, such as Na$_2$O. These additional glass compositions, however, either showed no advantage over Example 13–2, or else they tended to not flow as well as the coating produced by Example 13–2 during firing. Example 13–2 softens at approximately 900° C. Identified in the porcelain enamel literature as a key "adherence-promoter" for bonding to metals, Co$_3$O$_4$ was also incorporated into Example 13–2 to make glass composition Example 13–3, but we observed no obvious improvement in performance.

Initially, we melted in crucibles the glass compositions of Table 2. We then poured the glass melts as thin patties, and ball-milled the patties into frits having a mean particle size of 15–30 μm. These frits were sprayed subsequently onto various metal coupons by an air-gun using a suspension of nitrocellulose in amyl acetate as the organic media. When applied to the metal alloy surface, the glass coating is material comprised essentially of glass in particulate form that is subsequently sintered into an even coating. After allowing for drying, the sprayed coupons were fired from 900–1000° C. for the A335 metal, and from 1000–1200° C. for the HP-45 alloy.

The best composition for a glassy coating on both HP-45, and A335 metal was Example 13–2. FIG. 1 shows a plot of CTE vs. temperature for Example 13–2. Note that the coefficient of thermal expansion is in the range of 86–90×10$^{-7}$/° C. Despite this relatively low CTE, this glass composition adhered well when sprayed onto both the A335 alloy, fired at 900–1000° C., and HP-45 alloy, fired at 1000–1100° C. The service life of the coating was tested by thermal cycling. In this test, the coated samples were heated to and cooled from 200–1000° C. at a rate of 800° C./hr. over 4 cycles. We observed little or no spalling of the coating on any of the samples tested, even after the coated metal coupons were thermally cycled and sectioned with a diamond saw.

Therefore, the pure glass for the coating has a composition, in mole percent on an oxide basis, consisting essentially of:

| | |
|---|---|
| $SiO_2$ | 62.0–85.0 |
| $K_2O$ | 12.0–22.0 |
| $Al_2O_3$ | 0.0–5.0 |
| MgO | 0.0–10.0 |
| ZnO | 0.0–20.0 |
| $Co_3O_4$ | 0.0–5.0 |
| $Na_2O$ | 0.0–10.0 |
| $ZrO_2$ | 0.0–5.0 | and has a coefficient of thermal expansion in the range of $85–90 \times 10^{-7}/°$ C. over a temperature range of 25–600° C.

Section II.—Filled Glass Frits

Although glass composition Example 13–2 appeared to bond well to metal substrates having a much higher coefficient of thermal expansion, legitimate concerns about both its relatively low coefficient of thermal expansion and its low viscosity at the high potential operating temperatures found in a petrochemical refinery needed to be addressed. As stated previously, disparity of coefficients of thermal expansion can often cause a glass or glass-ceramic coating to crack and spall off a metal substrate, no matter how good the adhesion is between coating and substrate. Then again, low viscosity potentially may allow the glass coating to flow off of a metal substrate, hence, negating any protection we desire to impart to the metal by applying the coating in the first place. Gas flow found within ethylene refiners is near sonic speed. At such speeds, if the glassy coating were too soft, the flow may carry-off the coating layer, which would be scoured and easily removed from the interior metal surface of any tubing substrate. Accordingly, another consideration is a reasonable match in coefficient of thermal expansion between the glass and the metal surface that it coats. This becomes particularly important when austenitic-type metals are used, since these metals tend to have high CTEs in the range of $130–180 \times 10^{-7}/°$ C.

To raise the coefficients of thermal expansion of the potassium-silicate glasses to be more compatible with metals, the glasses can also be mixed with higher CTE inert fillers, such as $ZrO_2$ and leucite to achieve expansions close to $100 \times 10^{-7}/°$ C. In a more preferred embodiment, the potassium-silicate frit of composition Example 13.2, is filled with a leucite-nepheline glass-ceramic, which for ease of reference we have designated herein as 88LN. The leucite-nepheline glass-ceramic composition (88LN) preferably consists essentially of: 62.1% $SiO_2$, 18.9% $Al_2O_3$, 13.8% $K_2O$, 5.13% $Na_2O$, 5.0% $TiO_2$. The 88LN precursor glass melts at approximately 1300° C. In preparing samples of the filled glass coating blends, 88LN was cerammed at 1200° C., and ball-milled to a 10–20 micron mean particle size. Adding 88LN, which when cerammed has a high CTE at $200 \times 10^{-7}/°$ C., increases the lower CTE of the potassium-silicate glass composition.

Listed in Table 3 are compositions for two blends based on glass composition Example 13–2. Blend No. 45 contains by weight 20% $ZrO_2$, which was added to 80% ball-milled 13–2 glass frit. Blend No. 46 contains by weight 5% $ZrO_2$, 15% 88LN, and 80% ball-milled 13–2 glass frit. In both blends, the $ZrO_2$ had a mean particle size in the range of 5–10 microns, and the 13–2 glass frit had a mean particle size of 15–10 microns. After mixing, we pressed each blend into bars or disks, fired to 1000–1100° C., and then evaluated the samples for their physical properties. The addition of zirconia increased surface wetting.

TABLE 3

COMPOSITION OF FILLED GLASSES

| | Blend No. (Weight %) | |
|---|---|---|
| Potassium silicate glass | 45. | 46. |
| Example 13-2. | 80.0% | 80.0% |
| $ZrO_2$ | 20.0% | 5.0% |
| 88LN | — | 15.0% |
| CTE ($\alpha \times 10^{-7}/°$ C.) | 84–91 | 90–100 |
| Softening point | 907° C. | 910° C. |

Note that by incorporating the inert fillers in glass composition Example 13–2, we were able to increase both the coefficient of thermal expansion and the softening point of the blends. Characterization results, also listed in Table 3, show that Blend No. 46, containing cerammed 88LN, exhibited a coefficient of thermal expansion in the range of $90–100 \times 10^7/°$ C. over the temperature range of 1000–1100° C., and a softening point of about 907–910° C. By comparison, the unfilled potassium-silicate frit, Example 13.2, showed corresponding data that had a coefficient of thermal expansion of $86–89 \times 10^{-7}/°$ C., after firing to 1000–1100° C., and a softening point of 846° C.

We sprayed both blends of Table 3, onto HP-45 metal, and fired at 1000–1150° C. to produce glassy, well-adhered coatings. The coatings exhibited good resistance to coking when exposed to a hydrocarbon stream, under high temperature and pressure.

Therefore, the glass loaded with an inert filler having a CTE greater than the glass itself has a composition, in weight percent, consisting essentially of:

a) 80% of a glass having a composition, in mole percent on an oxide basis, consisting essentially of: 72.0–85.0% $SiO_2$, 12.0–17.0% $K_2O$, 0.0–5.0% $Al_2O_3$, and 0.0–10.0% MgO;

b) 13.0–18.0% of a leucite-nepheline filler having a composition, in mole percent on an oxide basis, consisting essentially of: 60.0–65.0% $SiO_2$, 12.8–14.8% $K_2O$, 16.3–22.0% $Al_2O_3$, 4.5–7.5% $Na_2O$, and 5.0% $TiO_2$, and having a CTE of $190–210 \times 10^{-7}/°$ C.; and/or c) 4.0–22.0% of zirconia.

Section III.—High-CTE Coatings by "Reactive-Ceramming"

As a more effective way of producing a coating to isolate and protect the various metal substrates surfaces, we have experimented and developed as part of the present invention a more efficient method of forming leucite as the predominant crystalline phase in a glassy coating or glass ceramic. Leucite is a high-melting point material ($T_{melt}=1693°$ C.) with a very high coefficient of thermal expansion of greater than $200 \times 10^{-7}/°$ C. In the past, leucite has been difficult to obtain as a single phase in glass-ceramics by the conventional glass-ceramic route because it crystallizes only sluggishly by means of bulk nucleation. Our alternative method is based upon a process called "reactive-ceramming," as described in U.S. Pat. No. 5,094,677 (Morena).

The reactive ceramming process is so named because it combines the actions of chemical reaction and devitrification. The basis of the reactive ceramic procedure contemplates an in situ reaction between a glass frit and a reactant powder(s). That is, the procedure can be described in terms of the following schematic equation:

glass + reactant(s)→leucite.

Although the reactive-ceramming process involves a precursor glass, the process differs from the production of crystallized bodies by the traditional glass-ceramic process, which is described schematically as: glass→crystal phase, with respect to compositional restraints on the precursor glass. Because in the customary glass-ceramic process emphasis focuses on maximizing the yield of crystals developed in the glass body, the starting glass, therefore, must bear a close compositional correspondence to the desired final crystalline product.

By contrast, in reactive-ceramming the precursor glass frit is present only as one of the required reactants needed to obtain the desired crystal phase. Hence, we are less constrained in the choice of starting glass by factors such as glass forming considerations or glass melting requirements. The starting glass in reactive ceramming can differ greatly in composition from the desired end product inasmuch as the glass is only one of a number of raw materials in the reaction scheme. Even though maximizing the crystal concentration is again the goal in reactive-ceramming, the greater degree of compositional flexibility that the process enjoys permits considerations such as glass melting temperature requirements and glass forming capability to play less of a role in the selecting of the precursor glass composition. Thus, we are able to produce glass-ceramic coating without being limited to a precursor glass of similar compositions to that of the final glass-ceramic material.

Figure 4:
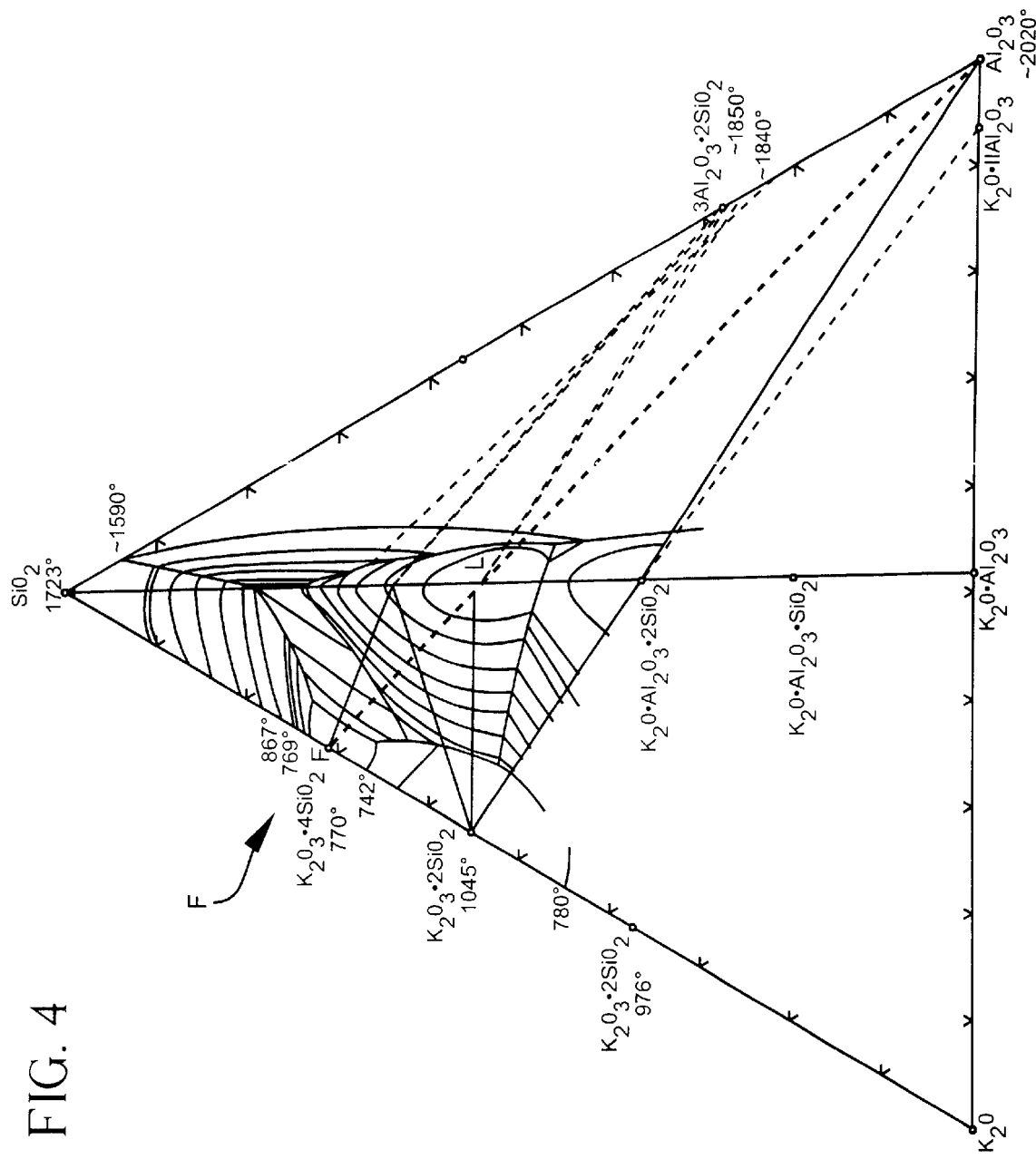
FIG. 4 is a $K_2O$—$Al_2O_3$—$SiO_2$ ternary phase diagram showing reaction couple (- - - -) between $K_2O$—$4SiO_2$ frit (F) and $\alpha$—$Al_2O_3$ to yield leucite (L)
Figure 4A:
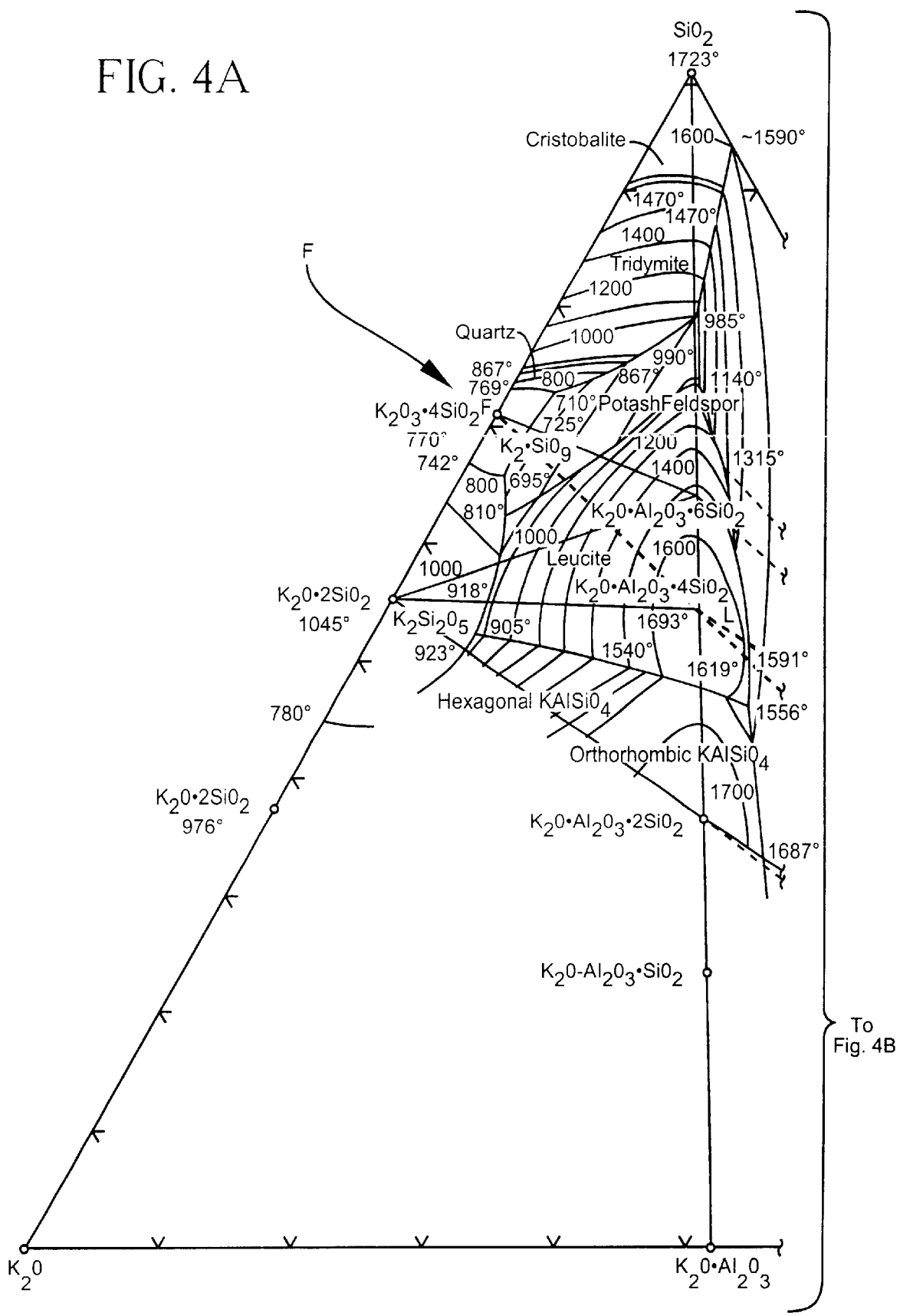

Even though the reactive-ceramming process is similar for leucite and pollucite, the set of oxides used in each ceramic compound is substantially different from each other. The constituent oxides used in forming leucite by means of the reactive-ceramming process do not necessarily react in the same way as those oxides used to form pollucite ($Cs_2O$—$Al_2O_3$—$4SiO_2$) in the Morena '677 patent. The preferred reactive-ceramming couple for leucite is frit + alumina. In contrast, because of low melting temperatures for cesium silicate glasses, two different reactive-ceramming couples are possible for pollucite: frit + alumina, and/or frit + clay (different frits). Stated more particularly, that is: $CS_2O \cdot 2SiO_2$ frit + $Al_2O_3 \cdot 2SiO2$ (dehydroxylated kaolin) →pollucite ($Cs_2O$—$Al_2O_3$—$4SiO_2$; whereas, the reactive ceramming in the present invention involves $K_2O \cdot 4SiO_2$ frit + $Al_2O_3$→leucite ($K_2O$—$Al_2O_3$—$4SiO_2$). As illustrated in FIG. 4, a $K_2O$—$Al_2O_3$—$SiO_2$ tenary phase diagram, the phase-field of leucite is defined by Region L. In FIG. 4, the reaction couple between $K_2O \cdot 4SiO_2$ frit (F) and α—$Al_2O_3$ to yield leucite (L) is shown as a dotted line (- - - -). The composition of $K_2O \cdot 2SiO_2$ frit + $Al_2O_3 \cdot 2SiO_2$ (dehydroxylated clay) could possibly also yield leucite, but this reactive couple would tend to operate only under temperature conditions higher than 1100–1200° C., since the liquidus temperature of the disilicate is higher than that of the tetrasilicate species.

Additional distinctions between the leucite and pollucite processes relate to their respective intended uses. Although pollucite exhibits a melting point above 1900° C., rendering it suitable for high temperature applications, but its thermal expansion coefficient ($40 \times 10^{-7}$/° C.) would not be satisfactory for coating metals since the CTE difference would be too great. Similarly, leucite's CTE ($180 \times 10^{-7}$/° C.) would be too high for diesel filter applications, the current potential application for pollucite type materials.

As potential starting glasses, the potassium-silicate glass compositions in Table seemed likely candidates for use in the reactive-ceramming process, since the $SiO_2/K_2O$ molar ratio was identical to leucite. These glasses can be mixed with aluminum oxide and other compounds to crystallize and form leucite ($K_2O$—$Al_2O_3$—$4SiO_2$), in situ, during a subsequent firing. We used glass composition Example 13–1 as the precursor frit for most of the initial work on reactive-ceramming. Although leucite was indeed formed after firing to 1100–1200° C., the fired coatings on metal coupon samples tended to be very porous, which is unacceptable in a coating designed to protect against carburization. Alternatively, when Example 13–2 was used as the precursor glass frit, we saw that some leucite did form, but also along with a MgO glassy layer. To avoid glassy layers in the coating other than leucite, the amount of other oxides present in the blend compositions have been kept less than 5% by weight. The more preferred blends used as the precursor frit glass composition Example 13–4, an iteration of Example 13–1, where ZnO partially replaces $K_2O$ and $SiO_2$. Essentially phase pure quantities of the desired leucite crystalline phase were obtained at temperatures as low as 1100° C., with CTE and melting point comparable to literature data reported for the pure compounds.

Table 4 records various blends used in the reactive-ceramming process to obtain leucite. As in the preparation of the filled glass compositions in Table 3, we first melted the reactant precursor frit, and then ball-milled the glass to a 10–20 μm mean particle size before mixing with a $Al_2O_3$-containing reactant on an approximate 80:20 weight basis to obtain the leucite stoichiometry. Other satisfactorily operative blends can contain frit amounts, specifically of the Example 13–4 composition, within a progressive range of from 68–85%, on a weight percent basis. Similarly, the respective ranges for precursor glass frit and alumina reactant content can extend from 70–90% frit, and 30–10% alumina, on a weight percent basis.

TABLE 4

REACTIVE-CERAMMING BLENDS PRODUCING LEUCITE-PREDOMINANT PHASE

| | Composition (weight %) Blend No. | | | | | |
|---|---|---|---|---|---|---|
| | 4431 | 4433 | 4438 | 4455 | 4456 | 4458 |
| Precursor Glass Frit | | | | | | |
| Example 13-1. | — | 80 | — | 78 | 80 | — |
| Example 13-4. | 73 | — | 80 | — | — | 71 |
| Alumina Reactant | | | | | | |
| Alcoa A-14-200M | — | — | — | — | 20 | — |
| Alcoa A-1000SG | 19 | 20 | 20 | 19 | — | 18 |
| Sintering Aid | | | | | | |
| 890FSU glass (44% MgO, 56% $B_2O_3$, wt. basis) | — | — | — | 3 | — | 3 |
| Supersil Sand CS200 ($SiO_2$) | 8 | — | — | — | — | 8 |

Firing @ 1150° C.

TABLE 4-continued

REACTIVE-CERAMMING BLENDS PRODUCING LEUCITE-
PREDOMINANT PHASE

| | Composition (weight %) Blend No. | | | | | |
|---|---|---|---|---|---|---|
| | 4431 | 4433 | 4438 | 4455 | 4456 | 4458 |
| for 1 hr. | | | | | | |
| Flow | Good | Poor | Good | Good | Good | Good |
| Porosity | Slight | High | High | Slight | Slight | Slight |
| Leucite yield | Medium | Medium | Medium | Medium | Low | High |

At the present time, the most preferred method of reactive-ceramming contemplates using powdered $Al_2O_3$-containing materials. The most preferred process involved the reaction of potassium silicate frit with an alumina. Because the reaction between the frit and alumina is surface-mediated, where the particle size of the material plays a role in the kinetics of the reaction, the mean particle size of the frit should not exceed about 30 microns, and will preferably range between 8–22 microns. The mean particle size of the alumina will preferably be even smaller, that is less than 12 microns. Two different types of $Al_2O_3$ were incorporated separately in our laboratory experimental blends. We used a calcinated alumina with a mean particle size of 5–10 microns, commercially available from Alcoa as A-14–200M, and a reactive alumina with a mean particle size of 0.2–0.5 microns, also commercially available from Alcoa as A-1000SG. Note that when contrasting blends No. 4433 with No. 4456, the leucite yield tends to increase with smaller, finer $Al_2O_3$ particle size.

For maximum yield of leucite crystallization, the mean particle size of the alumina will range between 0.1–0.6 microns, and not exceeding about 10 microns. Laboratory investigation indicates that the smaller the alumina particle size, the greater the driving force for reactive-ceramming, because of the greater amount of surface area available, which increases the reaction rate to crystallize leucite. Any increase in particle size of the alumina leads to a decrease in the yield of leucite crystals with a corresponding increase in the amount of uncombined reactants present, such as residual glass.

In addition to the precursor frit and alumina reactants, we added several materials at low levels, of less than 10% by weight, to serve as sintering aids. These sintering aids included a low-melting magnesium-borate glass frit, designated as 890FSU, consisting of 44% MgO and 56% $B_2O_3$, on a weight-percent basis, as well as fine silica, commercially known as Supersil Sand CS200. When comparing blends No. 4458 to No. 4438, surprisingly, the presence of sintering aids tended generally to increase the leucite yield, presumably as a result of increased mass transport rates.

After applying the various reactive-ceramming blends to metal coupons and firing to 1150° C. for one hour, we evaluated the various blends of Table 4 for the following criteria: flow, porosity, and leucite yield.

A good flow is desired for any glassy coating, since good flow implies strong adhesion and low porosity. To measure flow, we prepared the frit glass mixture. Initially, we placed the frit powder in a die-mold to form a 5-gram flow-button, and pressed to make a disk. After firing at temperature the pressed flow buttons were rated for flow. On one hand, the blend showed good flow if we observed some rounding of the corners on the button. On the other hand, if we observed straight edges on the button, then the blend demonstrated poor flow.

Given that carbon diffusion into the metal alloy causes carburization, we desired low porosity coatings. Sprayed and fired coatings on HP-45 metal coupons were rated for porosity depending on whether the coating was dense, slightly, or highly porous.

Lastly, we measured whether each blend produced a high leucite yield. Using X-ray diffraction, we analyzed flow-buttons that had been fired to determine the amount of leucite. If leucite crystals were present as a minor phase, then we had a low yield. If the crystals were present as an equal phase to glass or other compounds, we had a moderate or medium yield. And, if leucite was the dominate phase, the particular blend produced high yield.

Figure 2:
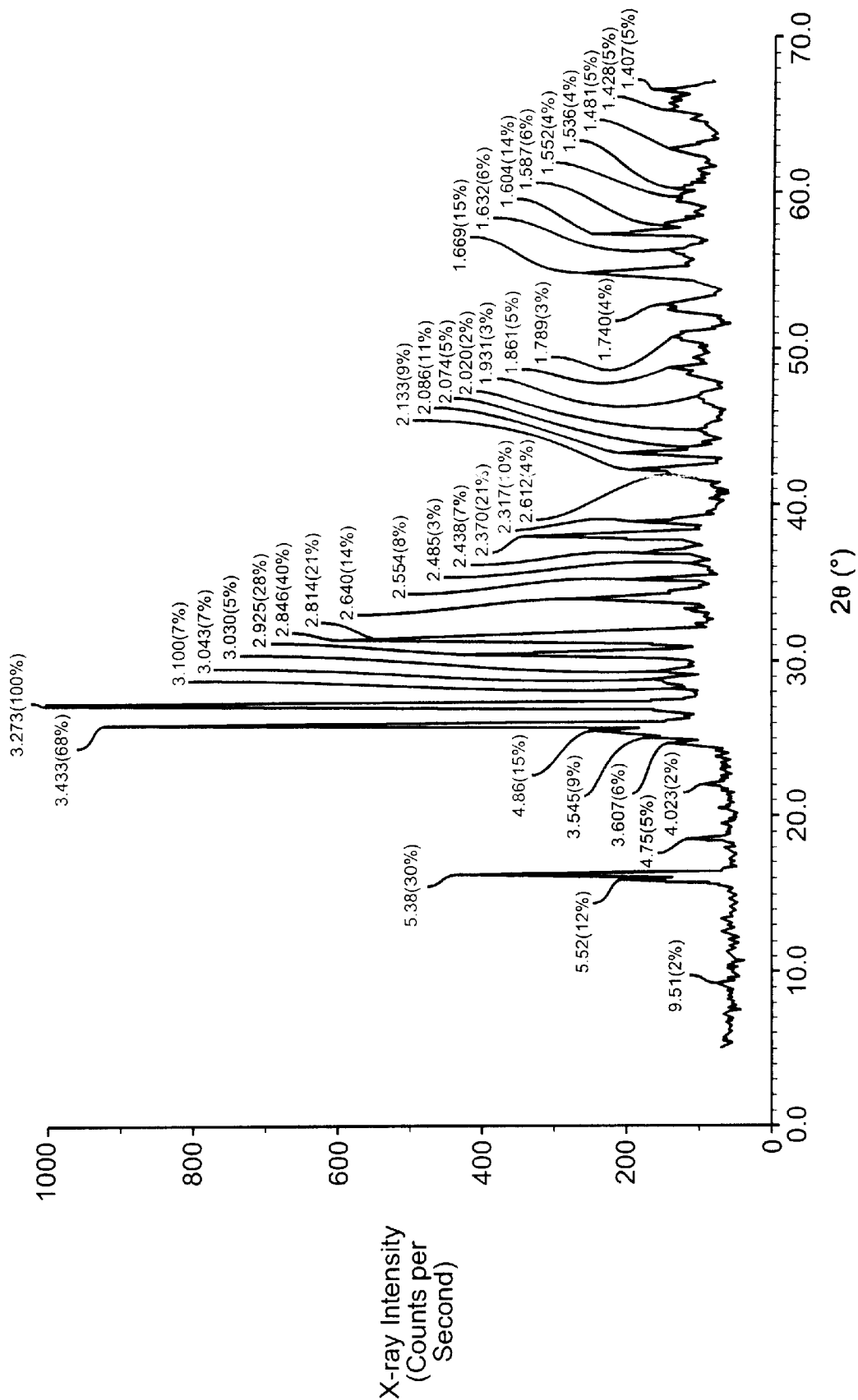
FIG. 2 is an X-ray diffraction pattern of a preferred glass-ceramic composition for the present invention having a predominantly leucite crystalline phase produced by reactive ceramming process.

As stated in Table 4, Blend No. 4458 combines all of the desired attributes of good flow, low porosity, and high leucite yield. FIG. 2 shows an X-ray diffraction pattern of a 4458 flow button after firing. Note the large amount of leucite present in the pattern (all major peaks are leucite). Except for a small amount of unreacted α—$Al_2O_3$, leucite constitutes the predominant phase in the material. Blend No. 4458, was based on glass composition Example 13–4, a ZnO substituted iteration of Example 13–1. The amount of ZnO present did not crystallize, but stayed in glassy phase. If anything, we believe that the presence of ZnO actually increased the leucite yield in the reactive-ceramming blends.

Figure 3:
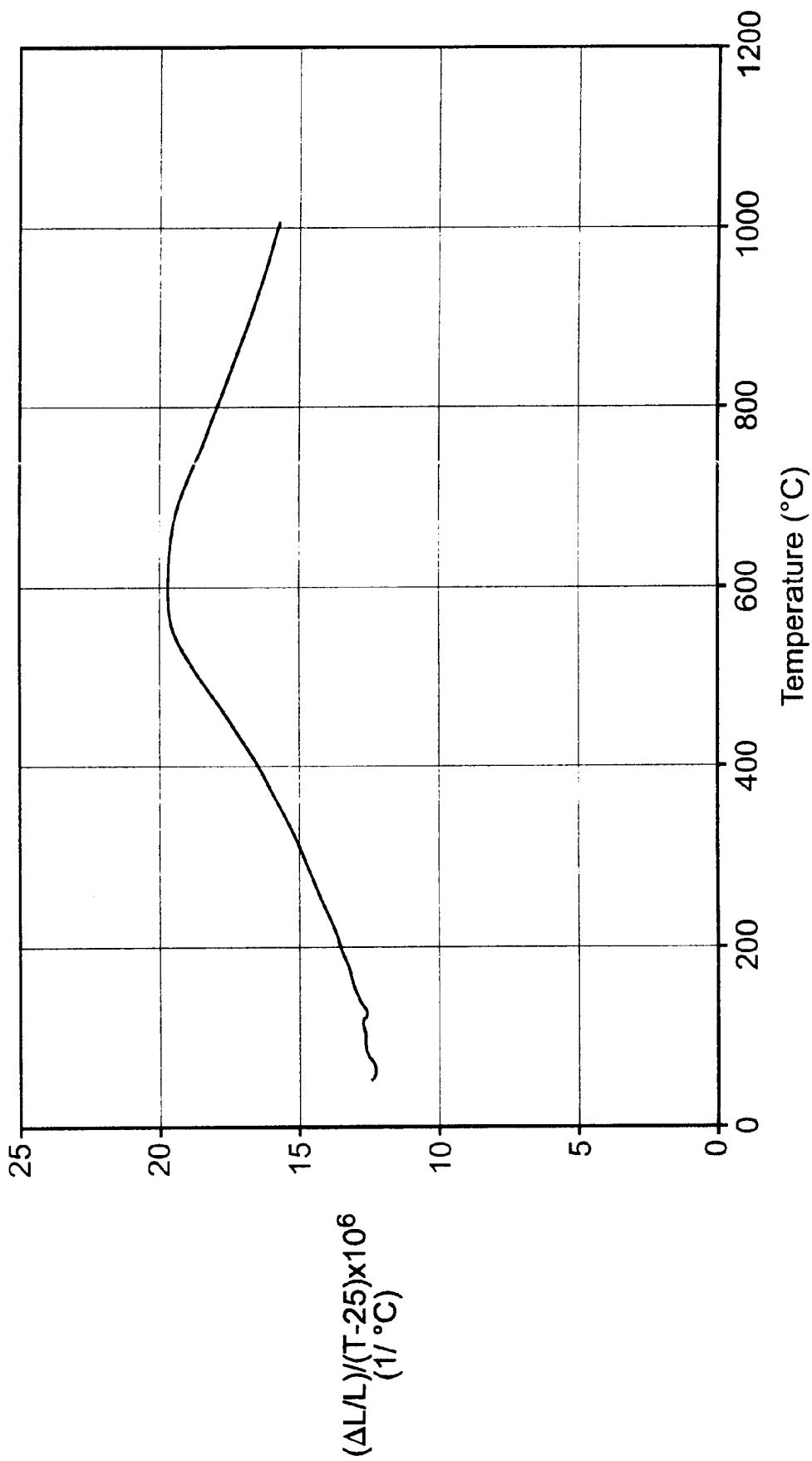
FIG. 3 is a CTE curve of a preferred glass-ceramic composition for the present invention having a predominantly leucite crystalline phase produced by reactive ceramining process.

FIG. 3 shows a plot of CTE versus temperature for a bar of 4458 blend that was fired to 1150° C. for one hour. Note the characteristic leucite-type expansion curve. At 600° C. the curve reaches a very high coefficient of thermal expansion of approximately $200 \times 10^{-7}/°$ C., after which the CTE values decrease slightly ($160 \times 10^{-7}/°$ C. at 1 000° C.) with increasing temperature. Refractory frits with coefficients of thermal expansion values as high as those shown in FIG. 3 could well have excellent potential as high temperature coatings for metal alloys used in the chemical process industry.

Therefore, the glass-ceramic with a predominant leucite crystalline phase has a composition, in weight percent, consisting essentially of:

a) 70.0–85.0% of a precursor glass-frit having a composition, in mole percent on an oxide basis, consisting essentially of: 62.0–82.0% $SiO_2$, 12.0–22.0% $K_2O$, 0.0–5.0% $Al_2O_3$, 0.0–5.0% MgO, and 0.0–20.0% ZnO;

b) 15.0–25.0% of alumina reactant;

c) 0.0–4.0% of a low-melting magnesium frit; and d) 0.0–9.0% of fine silica, which functions as a sintering aid, and wherein the alumina reactant reacts in proper proportions with the precursor glass-frit to produce a product having a stoichiometry approximating that of leucite.

Whereas in the above description the precursor glass has consisted essentially of: $K_2O$—$SiO_2$, with a minute amounts of $Al_2O_3$, those skilled in the relevant art will recognize that adjuvants and diluents, such as alkaline earth metal oxides, firing agents, ZnO, $SnO_2$, $ZrO_2$, can be incorporated in small amounts in the glass composition; that is, in amounts which do not cause the formation of low melting glassy phases, or cause the generation of low temperature crystal phases, or otherwise adversely affect the overall properties exhibited by a final product having a predominant leucite crystal phase.

Although the present invention has been fully described by way of examples, it is to be noted that various changes and modifications will be apparent to those skilled in the art. Therefore, unless such changes and modifications otherwise depart from the scope of the present invention, they should be construed as included therein.

We claim:

1. A method of isolating a metal surface that attracts carbon particles, the method comprising: applying a coating comprising $K_2O$, $SiO_2$ and optionally $Al_2O_3$, having a coefficient of thermal expansion (CTE) of at least $80 \times 10^{-7}/°$ C. onto the metal surface, wherein the coating is selected from the group consisting of a pure glass, a glass loaded with an inert filler having a CTE greater than the glass, and a ceramic having a predominant leucite crystalline phase and formed in-situ on the metal surface from reactions involving a glass.

2. A method of claim 1, wherein the pure glass of the coating has a composition, in mole percent on an oxide basis, consisting essentially of:

|  | Mole % |
|---|---|
| $SiO_2$ | 62.0–85.0 |
| $K_2O$ | 12.0–22.0 |
| $Al_2O_3$ | 0.0–5.0 |
| MgO | 0.0–10.0 |
| ZnO | 0.0–20.0 |
| $Co_3O_4$ | 0.0–5.0 |
| $Na_2O$ | 0.0–10.0 |
| $ZrO_2$ | 0.0–5.0 | and having a coefficient of thermal expansion in the range of $85-90 \times 10^{-7}/°$ C. over a temperature range of 25–600° C.

3. A method of claim 1, wherein the glass loaded with an inert filler having a CTE greater than the glass itself has a composition, in weight percent, consisting essentially of:

a) 80% of a glass having a composition, in mole percent on an oxide basis, consisting essentially of: 72.0–85.0% $SiO_2$, 12.0–17.0% $K_2O$, 0.0–5.0% $Al_2O_3$, and 0.0–10.0% MgO;

b) 13.0–18.0% of a leucite-nepheline filler having a composition, in mole percent on an oxide basis, consisting essentially of: 60.0–65.0% $SiO_2$, 12.8–14.8% $K_2O$, 16.3–22.0% $Al_2O_3$, 4.5–7.5% $Na_2O$, and 5.0% $TiO_2$, and having a CTE of $190-210 \times 10^{-7}/°$ C.; and c) 4.0–22.0% of zirconia.

4. A method of claim 1, wherein the ceramic having a predominant leucite crystalline phase has a composition, in weight percent, consisting essentially of:

a) 75.0–85.0% of a precursor glass-frit having a composition, in mole percent on an oxide basis, consisting essentially of: 62.0–82.0% $SiO_2$, 12.0–22.0% $K_2O$, 0.0–5.0% $Al_2O_3$, 0.0–5.0% MgO, and 0.0–20.0% ZnO;

b) 15.0–25.0% of alumina reactant;

c) 0.0–4.0% of a low-melting magnesium frit; and d) 0.0–9.0% of fine silica, which functions as a sintering aid, and wherein the alumina reactant reacts in proper proportions with the precursor glass-frit to produce a product having a stoichiometry approximating that of leucite.

5. A method of making a protective, high-CTE, glassy coating on a metal surface that comprises applying a mixture of a potassium-silicate glass and an $Al_2O_3$ containing material in such proportion such that said mixture reactively produces a ceramic having leucite as its predominant crystalline phase, to the metal surface.

6. The method of claim 5, wherein said ceramic is produced by a process known as reactive ceramming, which comprises the steps of:

a) melting a potassium silicate glass batch having a composition varying from approximately the stoichiometry of ($K_2O-2SiO_2$), to ($K_2O-4SiO_2$), to approximately the stoichiometry of leucite ($K_2O-Al_2O_3-4SiO_2$);

b) cooling said batch melt to a glass body;

c) comminuting said glass body to a frit;

d) mixing said glass frit with an $Al_2O_3$-containing material in proper proportions to produce a product having a stoichiometry approximating that of leucite; and then e) firing said mixture at a temperature in a range between 1100–1200° C., for a time sufficient to react said glass frit with said $Al_2O_3$-containg material to produce a highly crystalline article containing leucite as its predominant crystalline phase.

7. The method of claim 5, wherein said $Al_2O_3$-containing material is an alumina.

8. The method claim 5, wherein said $Al_2O_3$-containing material is in particle form having a mean particle size not to exceed 12 µm.

9. The method of claim 5, wherein said $Al_2O_3$-containing material is in particle form having a mean particle size preferably in the range of 0.2–0.5 µm.

10. The method of claim 5, wherein said potassium-silicate glass, as expressed in terms of mole percent on an oxide basis, consists essentially of: 62.0–75.0% $SiO_2$, 15.0–22.0% $K_2O$, 0.0–5.0% $Al_2O_3$, 0.0–18.0% RO, 0.0–10.0% $R_2O$, wherein RO is metallic oxide selected from the group consisting of ZnO, MgO, CaO, and BaO, and $R_2O$ is a metallic oxide selected from the group consisting of $Na_2O$ and $Li_2O$.

11. The method of claim 5, wherein said potassium silicate glass, as expressed in terms of mole percent on an oxide basis, consists essentially of: 62.0–68.0% $SiO_2$, 17.0–20.0% $K_2O$, 0.0–3.0% $Al_2O_3$, 0.0–16.0% RO, 0.0–10.0% $R_2O$, wherein RO is metallic oxide selected from the group consisting of ZnO, MgO, CaO, and BaO, and $R_2O$ is a metallic oxide selected from the group consisting of $Na_2O$ and $Li_2O$.

12. A method of protecting a metal surface from adverse effects of carbon that comprises coating said metal surface with a thin layer of a glass ceramic having leucite as its predominant crystalline phase, wherein the method further comprises:

a) providing a potassium silicate glass frit and a metal substrate to be coated;

b) mixing said potassium silicate glass with an $Al_2O_3$-containing material in proper proportions to produce a product having a stoichiometry approximating that of leucite ($K_2O-Al_2O_3-4SiO_2$);

c) depositing said mixture onto said metal substrate;

d) firing said mixture at a temperature of at least 1100° C., for a time sufficient to react said glass frit and said A12O3-containing material, to thereby produce upon said metal substrate a coating containing leucite as its predominant crystalline phase.

13. A composite article comprising a metal substrate and a continuous, adherent, glassy coating on a surface of the metal substrate to protect the article against an adverse effect of carbon on said surface, wherein the glassy coating comprises $K_2O$, $SiO_2$ and $Al_2O_3$, has a coefficient of thermal expansion (CTE) of greater than $85 \times 10^{-7}/°$ C., and is selected from the group consisting of a pure glass, a glass loaded with an inert filler having a CTE greater than the glass itself, or a glass-ceramic having a predominant leucite crystalline phase and formed in-situ on the metal surface.

14. A composite article of claim 13, wherein the glassy coating is a glass consisting essentially, in mole percent on an oxide basis, of:

| | |
|---|---|
| $SiO_2$ | 62.0–85.0 |
| $K_2O$ | 12.0–22.0 |
| $Al_2O_3$ | 0.0–5.0 |
| MgO | 0.0–10.0 |
| ZnO | 0.0–20.0 |
| $Co_3O_4$ | 0.0–5.0 |
| $Na_2O$ | 0.0–10.0 |
| $ZrO_2$ | 0.0–5.0 | and has a coefficient of thermal expansion in the range of $85–90 \times 10^{-7}/°$ C. over a temperature range of 25–600° C.

15. A filled glassy coating composition, in weight percent, consisting essentially of:

a) 75–85% of a glass composition, in mole percent on an oxide basis, consisting essentially of:

| | |
|---|---|
| $SiO_2$ | 72.0–85.0 |
| $Al_2O_3$ | 0.0–5.0 |
| $K_2O$ | 10.0–17.0 |
| MgO | 0.0–10.0 | b) and 15–25% of a filler consisting essentially of $ZrO_2$ and a leucite-nephaline glass ceramic, wherein said leucite-nephaline glass ceramic comprises a majority component of the filler, and wherein said leucite-nephaline glass-ceramic, in mole percent on an oxide basis, consists essentially of:

| | |
|---|---|
| $SiO_2$ | 60.0–65.0% |
| $Al_2O_3$ | 16.3–22.0 |
| $K_2O$ | 12.5–14.5 |
| $Na_2O$ | 5.13 |
| $TiO_2$ | 5.00 | having a CTE in the range of $100–120 \times 10^{-7}/°$ C., over 25–800° C.

16. A coating composition of claim 15 consisting essentially, in mole percent on an oxide basis, of:

| | |
|---|---|
| $SiO_2$ | 75.0–88.0 |
| $Al_2O_3$ | 0.0–5.0 |
| $K_2O$ | 10.0–17.0 |
| MgO | 1.0–7.0. |

17. A method of synthesizing a glassy coating in-situ on metals, wherein the method comprises:

a) providing a precursor glass-frit having a composition, on a mole percent basis consisting essentially of: 69.0–74.0% $SiO_2$, 13.0–20.5% $K_2O$, 0.0–5.0% $Al_2O_3$, 0.0–1.0% MgO, and 0.0–17.0% ZnO; and a metal substrate to be coated;

b) mixing said precursor glass-frit with an $Al_2O_3$-containing material in proper proportions to produce a product having a stoichiometry approximating that of leucite; and then c) depositing said mixture onto said metal substrate;

d) firing said mixture at a temperature in of at least 1100–1200° C., for a time sufficient to react said glass frit with said $Al_2O_3$-containing material to produce a highly crystalline coating containing leucite as its predominant crystalline phase.

18. A composite article of claim 13, wherein the glassy coating is a glass loaded with an inert filler having a CTE greater than the glass itself and has a composition, in weight percent, consisting essentially of:

a) 80% of a glass having a composition, in mole percent on an oxide basis, consisting essentially of 72.0–85.0% $SiO_2$, 12.0–17.0% $K_2O$, 0.0–5.0% $Al_2O_3$, and 0.0–10.0% Mgo;

b) 13.0–18.0% of a leucite-nepheline filler having a composition, in mole percent on an oxide basis, consisting essentially of 60.0–65.0% $SiO_2$, 12.8–14.8% $K_2O$, 16.3–22.0% $Al_2O_3$, 4.5–7.5% $Na_2O$, and 5.0% $TiO_2$, and having a CTE of $190–210 \times 10-7/°$ C. and c) 4.0–22.0% of zirconia.

19. A composite article of claim 13, wherein the glassy coating is a glass-ceramic having a predominant crystalline leucite phase, and made from the following materials:

a) 75.0–85.0% by weight of a precursor glass frit having a composition, in mole percent on an oxide basis, consisting essentially of 62.0–82.0% $SiO_2$, 12.0–22.0% $K_2O$, 0.0–5.0% $Al_2O_3$, 0.0–5.0% MgO, and 0.0–20.0% ZnO;

b) 15.0–25.0% of alumina reactant;

c) 0.0–4.0% of a low-melting magnesium frit; and d) 0.0–9.0% of fine silica, which functions as a sintering aid;

wherein the alumina reactant reacts in proper proportions with the precursor glass frit to produce a product having a stiochiometry approximating that of leucite.

* * * * *